May 31, 1955

W. A. WALLER 2,709,364

BALE WEIGHT GAUGE

Filed April 10, 1953

INVENTOR.
WILLIE A. WALLER,
BY
McMorrow, Berman + Davidson
ATTORNEYS.

United States Patent Office 2,709,364
Patented May 31, 1955

2,709,364

BALE WEIGHT GAUGE

Willie A. Waller, Loving, N. Mex.

Application April 10, 1953, Serial No. 347,991

2 Claims. (Cl. 73—141)

This invention relates to weight gauge devices, and more particularly to a device for indicating the weight of cotton in a baling press.

A main object of the invention is to provide a novel and improved weight gauge means for cotton or similar material being baled, the weight gauge means being simple in construction, being easy to install on a baling press, and providing an accurate indication of the weight of cotton in the press.

A further object of the invention is to provide an improved weight gauge means for determining the weight of cotton in a baling press, whereby uniformity in bale weights will be obtained as cotton is ginned, the device of the present invention being adapted to eliminate variations in bale weights, as is now experienced in carrying out this process, and the device being inexpensive to manufacture, sturdy in construction, and reliable in operation.

Further objects and advantages of the invention will become apparent from the following description and claims, and from the accompanying drawings, wherein:

Figure 1:
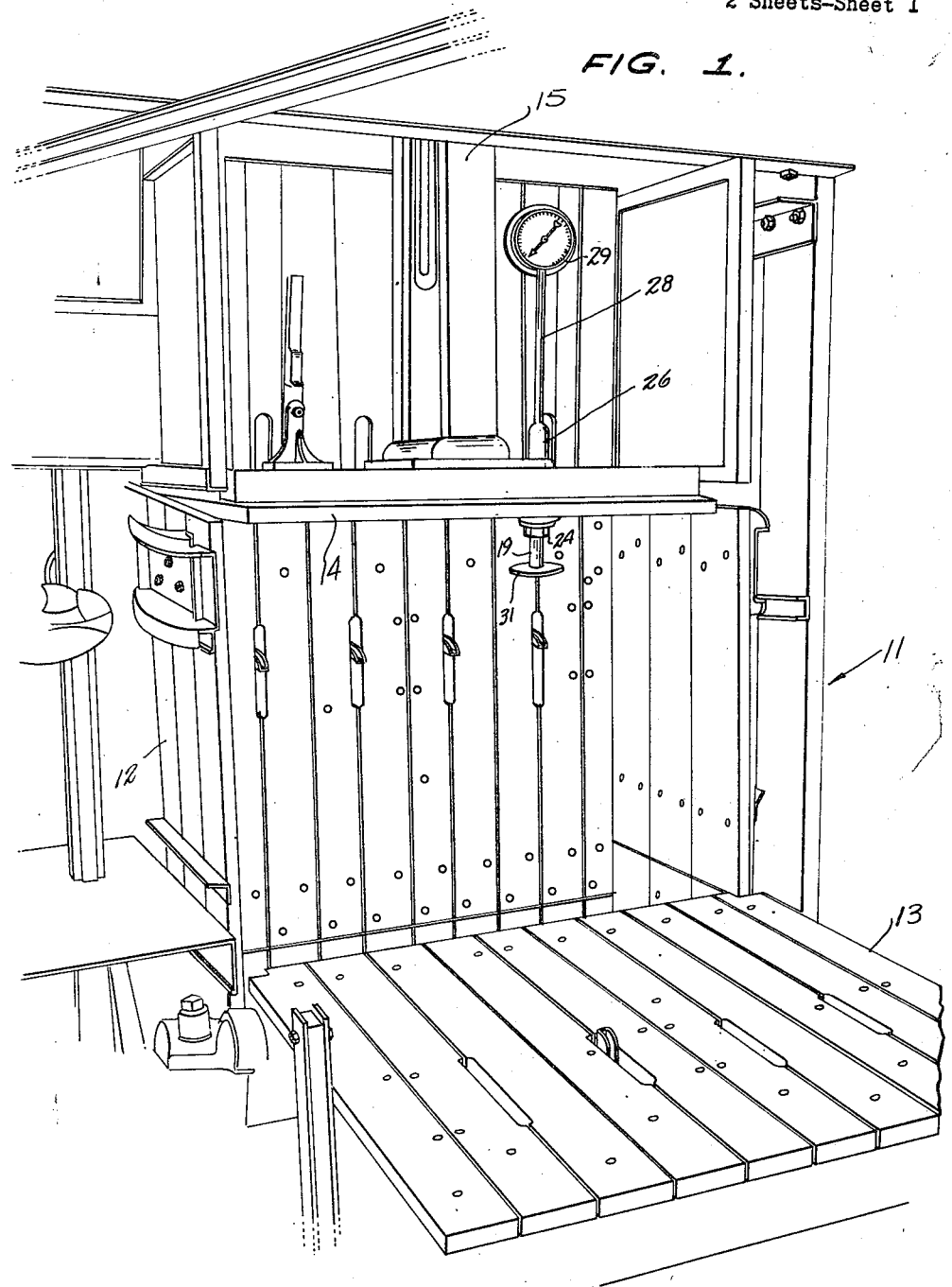
Figure 1 is a perspective front view of a press box employed in a baling press with the front wall of the press box opened, the press box being provided with an improved weight gauge means constructed in accordance with the present invention.

Referring to the drawings, 11 generally designates a baling press of conventional construction, said baling press including a press box 12 having the hinged front wall 13, said wall being adapted to be swung to an open position, such as the position shown in Figure 1, wherein access to the interior of the press box may be obtained, as where it is desired to remove a bale therefrom after the bale has been formed. Designated at 14 is the relatively large pressure piston, said pressure piston defining the top wall of the press box and being connected to the piston beam 15 which delivers the downward baling force on the pressure piston 14 in the usual manner.

Figures 2, 3:
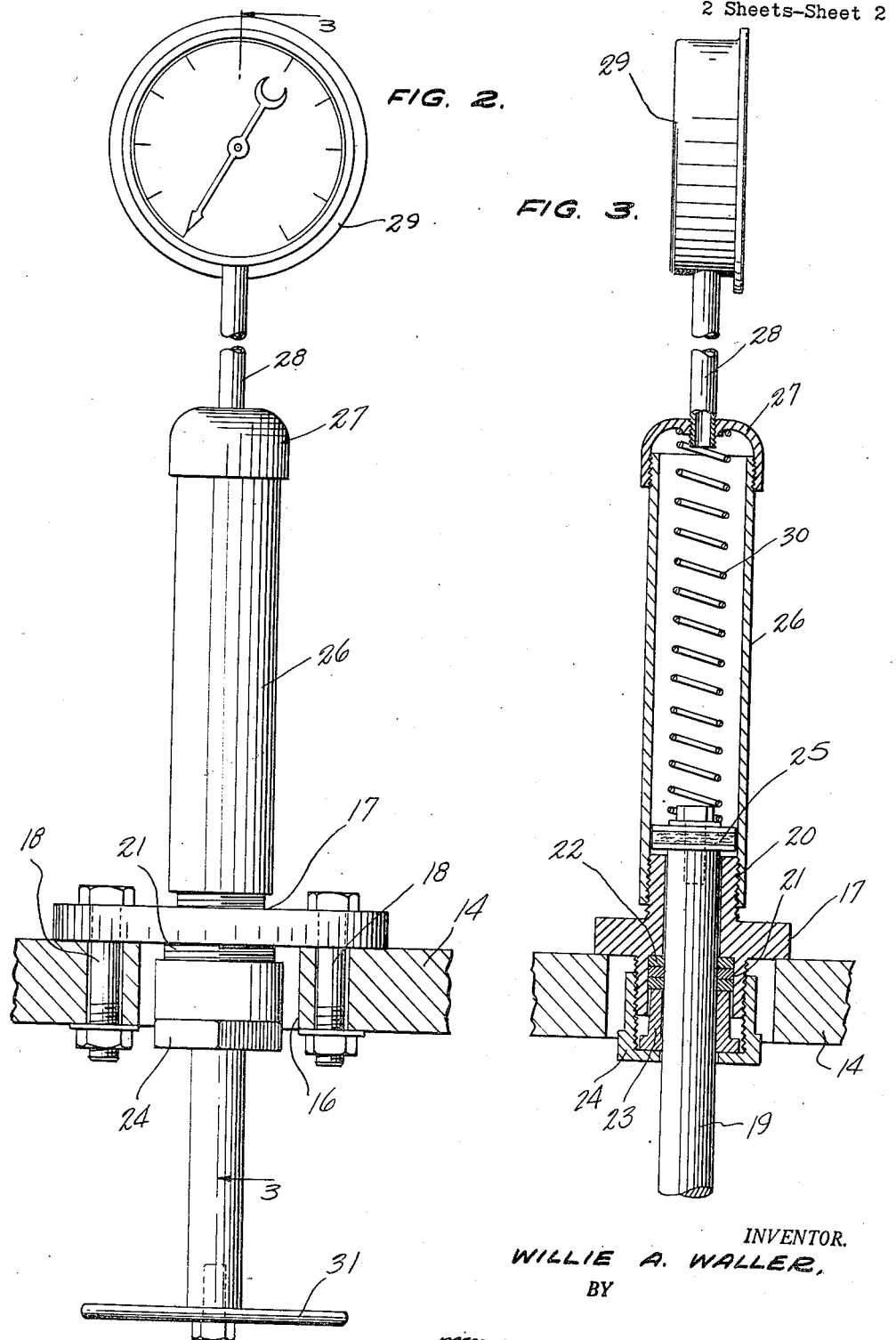
Figure 2 is an enlarged vertical cross sectional view taken through the pressure piston of the baling press of Figure 1 and showing the improved weight gauge means in elevational view.
Figure 3 is a vertical cross sectional view taken on the line 3—3 of Figure 2.

The rectangular pressure piston 14 is formed adjacent its connection to the pressure beam 15 with a circular aperture 16. Designated at 17 is a flanged bushing member which is secured to the large pressure piston 14 over the aperture 16, as by the fastening bolts 18, 18 extending through the flange of the bushing 17 and through the pressure piston 14 adjacent the aperture 16, as shown in Figure 2. Designated at 19 is a vertical plunger rod which extends through the upstanding sleeve portion 20 of the bushing 17 and is slidably and sealingly engaged by a sealing gland carried by the bushing. Said sealing gland comprises a depending, externally threaded shell 21 integrally formed on the bushing concentrically with the rod 19 which contains deformable packing 22 arranged around the rod, as shown in Figure 3, the packing 22 being compressed by an annular sleeve element 23 which bears upwardly on the packing 22 and which is engaged by the annular gland nut 24, said nut being provided with internal threads engaging the external threads on the shell member 21, as is clearly illustrated in Figure 3.

Secured to the top end of the plunger rod 19 is the guide piston 25. Threaded on the bushing portion 20 is the vertical tubular sleeve member 26 in which the guide piston 25 is loosely received and is freely slidable. The guide piston 25 is slidable inside the sleeve 26 but does not make sealing contact therewith, clearance being provided for the free circulation of air around the guide piston 25 in the sleeve 26. Threadedly engaged on the top end of the tubular sleeve 26 is the cap member 27, and threadedly secured centrally in the cap member 27 is the vertical tube 28 connected at its top end to the pressure gauge 29. Designated at 30 is a coiled spring which is positioned axially in the sleeve 26, bearing at its top end on the under surface of the cap member 27 and at its bottom end on the guide piston 25, thereby biasing the plunger rod 19 downwardly.

Secured to the bottom end of the plunger rod 19 is the pressure disc 31, said pressure disc being relatively large in diameter. As shown in Figures 2 and 3, the plunger member 19 is also of relatively large diameter and upward movement of the plunger rod 19 causes the air in the sleeve 26 to be compressed in accordance with the upward volumetric displacement produced by the upward movement of the plunger rod 19.

With the device arranged as shown in Figure 1, a quantity of cotton or similar material to be baled is placed in the press box in the usual manner, and the box is closed by locking the cover 13 thereof in its vertical position. A downward force is then applied by means of the beam 15, causing the pressure piston 14 to be moved downwardly and causing the material in the press box to be compressed to a predetermined volume. The compression of the material produces an internal pressure in the press box 12 which is transmitted to the plunger rod 19 and forces said plunger rod upwardly against the air pressure in the sleeve 26 and the biasing force exerted by the spring 30. However, the plunger rod 19 will move upwardly in accordance with the amount of internal pressure developed in the material, and this internal pressure will, of course, depend upon the amount of material contained therein, since the material is compressed to a predetermined volume. Therefore, the amount of material in the press box will be indicated by the pressure gauge 29, since the pressure developed in the cylinder 26 will be directly proportional to the degree of upward movement of the plunger member 19, and the degree of upward movement of said plunger rod 19 will be proportional to the amount of internal pressure developed in the press box. Therefore, since the volumetric upward displacement of the plunger rod 19 in the sleeve 26 is directly proportional to the amount of material in the press box, and since this volumetric displacement upwardly of said plunger rod will produce a pressure reading on the pressure gauge 29, the gauge 29 can be calibrated directly in terms of weight of the material, enabling the weight of material in the press box to be read directly. Therefore, by the means above described, the weight of material in a bale of given volume, as where the piston 14 is moved downwardly to a predetermined position in the press box 12, can be indicated directly on the pressure gauge 29.

While a specific embodiment of an improved weight gauge means for use in a baling press has been disclosed in the foregoing description, it will be understood that various modifications within the spirit of the invention may occur to those skilled in the art. Therefore, it is

What is claimed is:

1. In a baling press, a material receiving box, a vertically moving material compressing piston mounted in said box, said piston having a head, a vertical cylinder having a lower end fixed on said head and a closed upper end, a plunger working in said cylinder, said plunger having a lower portion depending through a portion on said head into the interior of said box, said lower end portion of the piston having a member for engagement with compressed material present in said box, and a fluid pressure gauge on said cylinder and communicating with the interior of the cylinder at a point between said plunger and the closed upper end of the cylinder.

2. In a baling press, a material receiving box, a vertically moving material compressing piston mounted in said box, said piston having a head, a vertical cylinder having a lower end fixed on said head and a closed upper end, a plunger working in said cylinder, said plunger having a lower portion depending through a portion on said head into the interior of said box, said lower end portion of the piston having a member for engagement with compressed material present in said box, and a fluid pressure gauge on said cylinder and communicating with the interior of the cylinder at a point between said plunger and the closed upper end of the cylinder, said portion on the piston head comprising a seal surrounding said lower portion of the plunger.

References Cited in the file of this patent

UNITED STATES PATENTS

| | | |
|---|---|---|
| 2,383,554 | Krickler | Aug. 18, 1945 |
| 2,561,266 | Dietert | July 17, 1951 |
| 2,579,444 | Taylor | Dec. 18, 1951 |